Aug. 3, 1965  M. LASKY  3,199,115
METHOD FOR MAKING A SOUND MOTION PICTURE
FILM WITH WORDS THEREON
Filed April 29, 1963  5 Sheets-Sheet 1

INVENTOR.
MAX LASKY
BY
ATTORNEY

Aug. 3, 1965   M. LASKY   3,199,115
METHOD FOR MAKING A SOUND MOTION PICTURE
FILM WITH WORDS THEREON
Filed April 29, 1963   5 Sheets-Sheet 2

INVENTOR.
MAX LASKY
BY George A. Schwenzer
ATTORNEY

Aug. 3, 1965   M. LASKY   3,199,115
METHOD FOR MAKING A SOUND MOTION PICTURE
FILM WITH WORDS THEREON
Filed April 29, 1963   5 Sheets-Sheet 3

INVENTOR.
MAX LASKY
BY
ATTORNEY

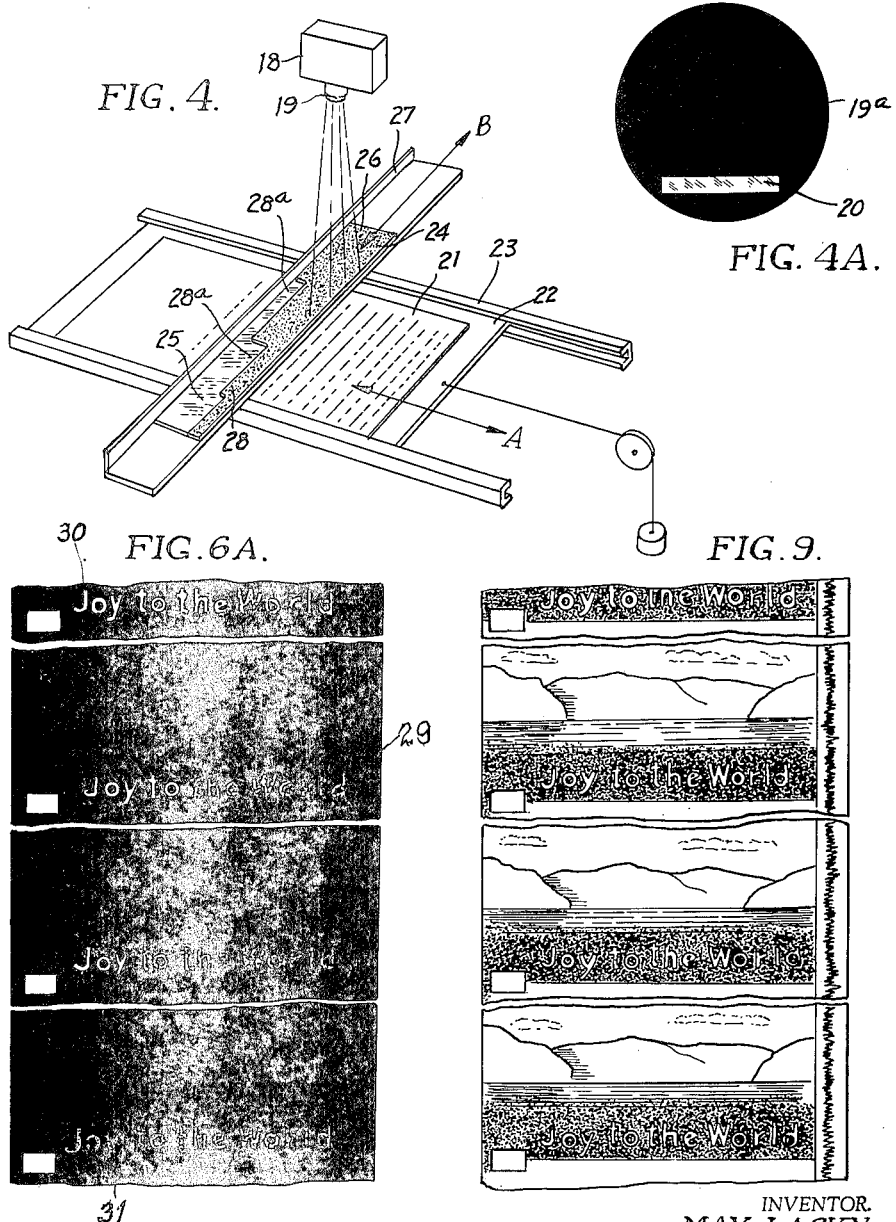

Aug. 3, 1965    M. LASKY    3,199,115
METHOD FOR MAKING A SOUND MOTION PICTURE
FILM WITH WORDS THEREON
Filed April 29, 1963    5 Sheets-Sheet 5
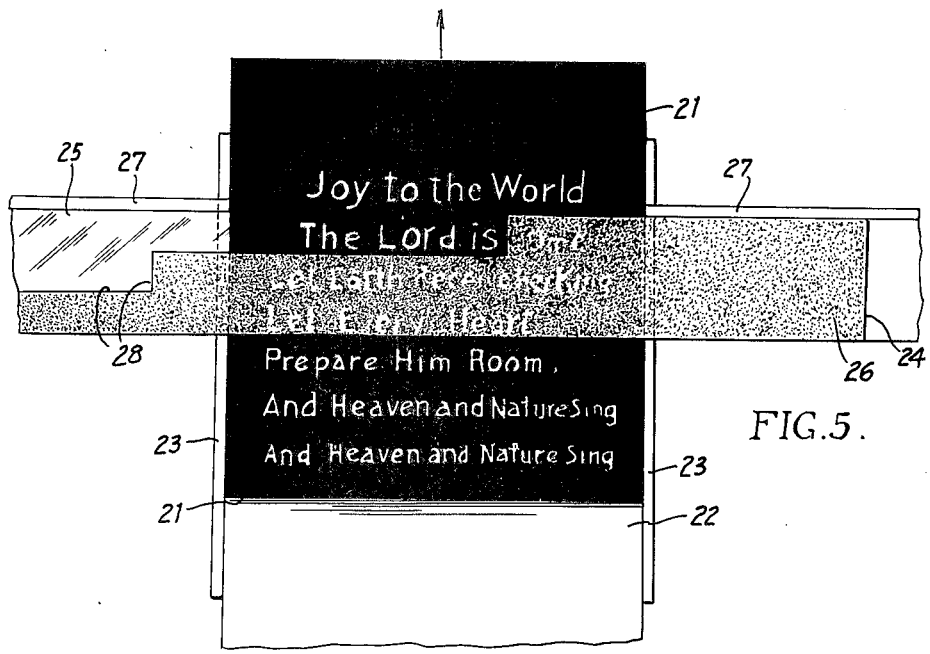
FIG. 5.
FIG. 6.
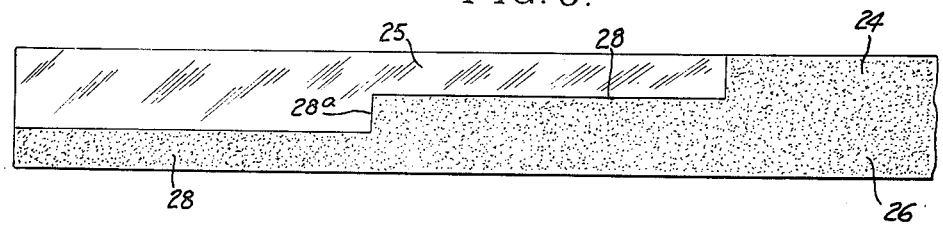
FIG. 7.
Joy to the World, the Lord is come, let Earth Receive
INVENTOR.
MAX LASKY
BY *George A. Schwenger*
ATTORNEY

United States Patent Office 3,199,115
Patented Aug. 3, 1965

3,199,115
METHOD FOR MAKING A SOUND MOTION PICTURE FILM WITH WORDS THEREON
Max Lasky, 574 Torrence Lane, Cincinnati, Ohio
Filed Apr. 29, 1963, Ser. No. 278,512
3 Claims. (Cl. 352—5)

My invention relates to the type of motion picture film used as audio visual aids whereby pictures, printed words, music and enunciation of the words are synchronized for instantaneous viewing, reading and enunciation spoken and/or sung in proper time relation each to the other.

Many films for visual aids have combined pictures and words synchronized with sound. Most all of prior films have one or more of the following distracting elements: they lack close synchronization between picture and sound; have confusing indications as to when words are to be spoken or sung; require re-exposing or double exposing parts of the film; the need for special equipment for projection, provide no possibility of pre-reading, and stilted and confining methods of mathematically determining where the emphasis should occur.

It is an object of my invention to provide a process for producing motion picture films that have a moving background displaying lines of words semi-illuminated and have each word in sequence snap suddenly into intense illuminated emphasis in sound and time relation to the enunciation of the word on the sound track during projection of the film.

Another object of my invention is to provide a motion picture film whereby a semi-illuminated line of words are simultaneously photographed while single words in said line of words are photographed and are illuminated separately in sequence for reading and enunciation in unison with projected sound, and have a complete line of enunicated fully illuminated words pass out of the picture.

A further object of my invention is to provide a process and film whereby the sudden illumination of the words in sequence synchronized with sound by the beginning of the vocal reverberation of each of the words and the time interval for each word is determined by the start of the vocal reverberation of the next succeeding word as related to a common beginning reference point.

These and other objects of my invention can be readily understood by reference to the accompanying drawings in which:

FIGURE 1 schematically illustrates the first step in my process wherein a motion picture film and sound tape are produced.

FIGURE 2 schematically illustrates a second step utilizing a magnetic recording tape on which a beat track is recorded.

FIGURE 3 schematically illustrates the third step transferring the magnetic beat track to an optical film track for visual observation of the beat track.

FIGURE 4 schematically illustrates a device used in the fourth step for producing the film having the sequence of words transformed suddenly from semi-illuminated to fully illuminated words.

FIGURE 4A illustrates the masked lens of an animation camera.

FIGURE 5 is a plan view of the assembly of a master card and mask for photographing and suddenly illuminating words in sequence.

FIGURE 6 is a plan view of the mask.

FIGURE 6A illustrates a word film for super-emphasizing on the completed sound and action film.

FIGURE 7 illustrates a line of a song and music to which it is to be sung.

FIGURE 9 illustrates frames of a completed motion picture film illustrating a fully illuminated word together with semi-illuminated other words.

Figure 1:
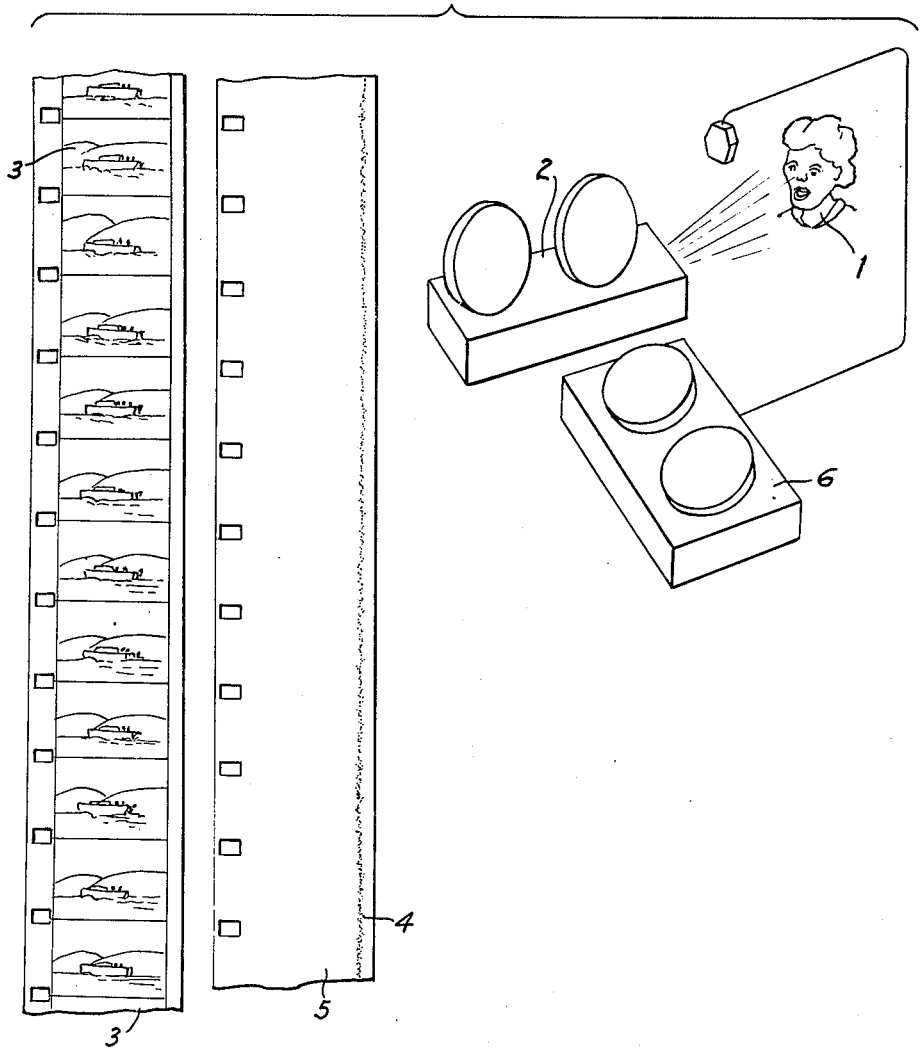

Referring to FIGURE 1, showing the first step in my process, there is a singer 1 being photographed by a conventional movie camera 2. Simultaneously with the taking of the picture on a motion picture film 3 a voice track 4 is recorded on a recording tape 5 by a synchronized tape recorder 6. This results in a photograph of a film subject with a double system of a picture on the film and a separate tape for sound. All of the films and sound track tapes throughout have a common reference beginning point. The several steps are preformed with the aid of synchronized equipment.

Figure 2:
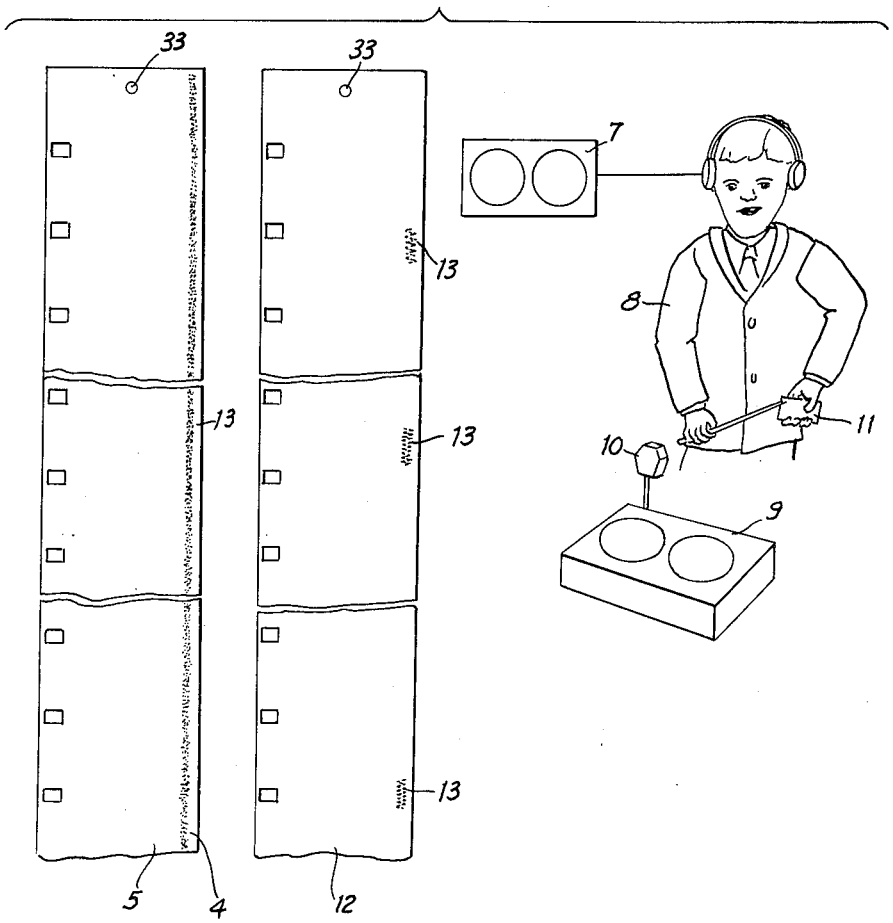

In FIGURE 2 there is schematically illustrated the second step in my process wherein the tape 5 with the sound track 4 is played back through a synchronized sound reproducer 7. This sound track is listened to by an operator 8 through ear phones, as opposed to listening to the music or sound coming through a speaker system. Adjacent to the operator is another synchronized tape recorder 9 connected to a microphone 10. The operator has a device 11 which produces a distinct sharp clicking sound that is recorded on a blank recording tape 12. Only the clicking sound will be recorded as illustrated at 13 on the tape. Actually there is no sound track visible on the tape. The clicking sound is made by the operator at the beginning as each word is sung or spoken and is synchronized in accurate timed relation with the first vocal sound necessary to enunciate a word. Each click determines the time and place on the film when a word in a sequence of words is to be snapped from subdued to full illumination.

Figure 3:
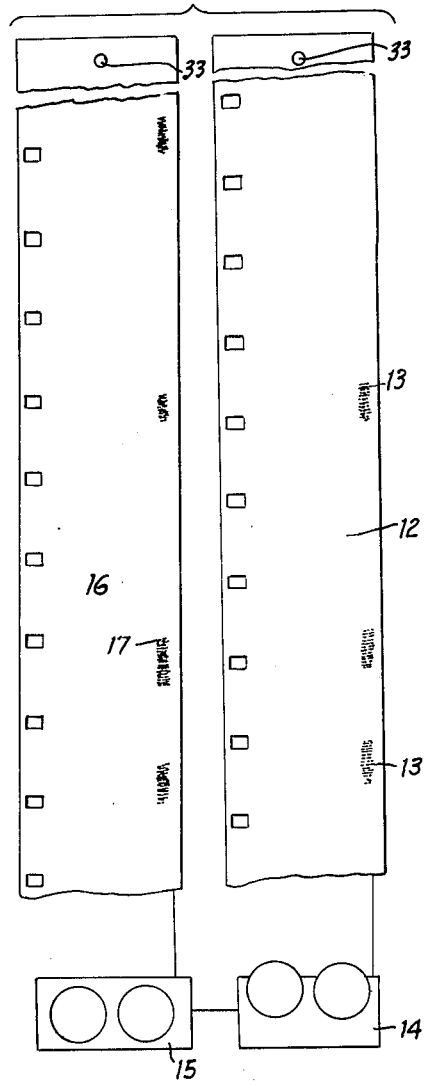

In FIGURE 3, which illustrates step three, there is schematically illustrated a tape play back device 14 and an optical recorder 15 whereby only the invisible beat track 13 on the tape is recorded visibly on to the sound track of a motion picture film 16. This visibly fixes the beginning point 17 for each word and the time at which each word is to become fully illuminated. After the transfer a tabulation is made of the number of frames to fix the beginning point of a word to be fully exposed by an animation camera 18, FIGURE 4.

Figure 8:
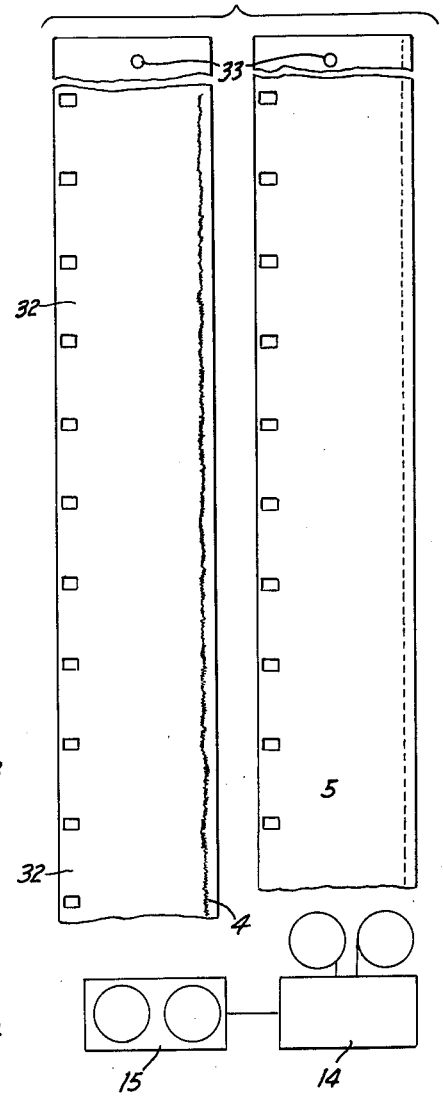
FIGURE 8 is a schematic illustration of transferring the sound from tape to motion picture film.

In FIGURE 8, which illustrates the fourth step in my process, there is illustrated the tape play back device 14 and the optical recorder 15 whereby the entire sound 4 of the subject on tape 5 is transferred on a motion picture film 32 which is the final sound track to be imprinted on the subject film.

In FIGURE 4 the fifth step of my process is schematically illustrated. An animation camera 18 is used to photograph words in sequence fully illuminated at their starting points as determined by step three. A lens 19 of the animation camera, FIGURE 4A, has an opaque mask 19a with a portion 20 of the lens 19 unmasked to limit the amount of light reaching the film in the area to be photographed. For illustrative purposes the area accommodates two lines of the song at one time but not limited thereto. A card 21, FIGURES 4 and 5, supported on a movable platen 22 is placed beneath the camera in proper focus with the words to be photographed. The card has a black back-ground with the words printed thereon in white. Only the words will appear on a motion picture film as explained below. This card 21 is arranged to slide between guides 23 longitudinally and laterally in relation to the camera 18 above it, as indicated by the arrow A in FIGURE 4. A movable flat mask 24 having a transparent area 25 and a semi-transparent area 26 is placed over the words on the card 21. The mask is arranged to slide back and forth crosswise of the card as indicated by the arrow B in FIGURE 4 and is held in alignment with the lines of words by means of guides 27, see FIGURE 4. The semi-transparent area is arranged in steps 28. These steps permit the unmasking of words to snap fully illuminated in sequence at the proper beginning point determined in step three while exposing succeeding words in subdued legible illumination for contrast during photographing and in projection. Each word uncovered remains uncovered during the photographing of succeeding words. After photographing a required number of frames to reach the starting point of a succeeding word the mask is moved to the right and another word is photographed fully illuminated the required number of frames. This process is continued for each word in a line. During the snap illumination of the words the mask 24 is shifted laterally in relation to the camera a slight amount to cause each word to become fully illuminated and keeps moving laterally until the last word in the line has been suddenly illuminated at which time the line of fully illuminated words will pass up and out of the picture. When the last word in a line has been unmasked and photographed, the riser 28a will be in position to expose the first word of the second line. Word after word is exposed and photographed fully illuminated and the masked words will be photographed semi-illuminated as word film 29 wherein the fully illuminated words are indicated as 30 on the film and the semi-illuminated words as 31 on the film. By the time all the words in the second line have been photographed and fully illuminated the card has been moved laterally to bring the next line into the unmasked area of mask 19 and the mask 24 is moved to the left to cover the new line with the semi-transparent area of the mask 24. This causes the previously fully illuminated word to roll up and out of sight of the projected image. The photographing of each word in sequence is continued until all the words have been photographed at the required frame number for each word as synchronized with and determined by the beat track and each succeeding line will roll up and out of the projected image.

A composite film is then made by the well known motion picture technique whereby the motion picture film 3 (FIGURE 1) with the subject photographed, the word film 29 (FIGURE 6A) with the photographed words and a film 32 (FIGURE 8) with the sound track 4 registered thereon are superimposed on each other in proper index and alignment by means of the common reference beginning point holes 33 on the beginning of each of these films.

The manipulation of the mask during the photographing of the words causes each of the words to snap in full illumination during projection and at the same time exposes succeeding words in legible semi-illumination on a screen. During projection two lines are projected on to the screen and each line after exposure moves out of sight while a new line appears in semi-illuminated projection.

Essentially my film and process comprises the photographing of a subject separately on a film and simultaneously making an invisible sound track on a tape; producing a beat measuring tape; transferring that on to an optical sound track; making a sound track film from the original sound tape; photographing words in fully illuminated exposure while simultaneously photographing legible semi-illuminated words in synchronized relation with sound of the words, as determined by the first vocal sound, of each word, to be sung and finally combining the subject film; the sound track film and the word exposure film to produce a composite film; wherein fully illuminated words are in synchronization with vocal expression and style of the original recorded subject, and simultaneously semi-illuminated words are projected in sequence during the vocal expression of the fully illuminated words and causing each line in sequence to roll off and out of sight from the projected image.

Having thus described my invention, I claim:

1. A method for producing an audio visual emphasis motion picture film comprising the following steps; providing a visual motion picture film and photographing thereon a vocalizing subject; providing a sound recording film and recording thereon the sound of the vocalizing photographed on the visual motion picture film; providing a beat measuring tape and recording thereon a series of beats indicating the start of each word of the vocalizing photographed on the visual motion picture film; providing a word exposure film and photographing thereon words in fully illuminated exposure in synchronism with the beats of said beat measuring tape while simultaneously photographing legible semi-illuminated words in spaced relationship to said fully illuminated words, whereby said semi-illuminated words are adapted to be projected on a screen simultaneously with the fully illuminated words; and finally providing an unexposed motion picture film and photographically superimposing thereon the visual motion picture film, the sound recording film, and the word exposure film to provide a composite film whereby, upon projection of said composite film semi-illuminated words and fully illuminated words are projected in synchronism with the vocal expression of the visual motion film.

2. A method for producing an audio visual emphasis motion picture film comprising the following steps; providing a visual motion picture film and photographing thereon a vocalizing subject; providing an audio recording tape and recording thereon the sound of the vocalizing photographed on the visual motion picture film; providing an unexposed sound track film and transferring thereon the sound of the vocalizing previously recorded on said audio recording tape; providing a beat measuring tape and recording thereon a series of beats indicating the start of each word of the vocalizing photographed on the visual motion picture film; providing a word exposure film and photographing thereon words in fully illuminated exposure in synchronism with the beats of said beat measuring tape while simultaneously photographing legible semi-illuminated words in spaced relationship to said fully illuminated words whereby said semi-illuminated words are adapted to be projected on a screen simultaneously with the fully illuminated words; and finally providing an unexposed motion picture film and photographically superimposing thereon the visual motion picture film the sound recording film, and the word exposure film to provide a composite film whereby, upon projection of said composite film, semi-illuminated words and fully illuminated words are projected in synchronism with the vocal expression of the visual motion film.

3. A method for producing an audio visual emphasis motion picture film comprising the following steps; providing a visual motion picture film having a starting reference point and photographing a vocalizing subject thereon; providing an audio recording tape and recording thereon the sound of the vocalizing photographed on the visual motion picture film; providing an unexposed sound track film having a starting reference point and transferring thereon the sound of the vocalizing previously recorded on said audio recording tape; providing a beat measuring tape and recording thereon a series of beats indicating the start of each word of the vocalizing photographed on the visual motion picture film; providing a visual motion film and recording visibly thereon the beats previously recorded on said beat measuring tape; providing a word exposure film having a starting reference point and photographing thereon words in fully illuminated exposure in synchronism with the beats of said beat measuring film tape while simultaneously photographing legible semi-illuminated words in spaced relationship to said fully illuminated words whereby said semi-illuminated words are projected on a screen simultaneously with the fully illuminated words and finally providing an unexposed motion picture film and photographically superimposing thereon the visual motion picture film, the sound recording film and the word exposure film with the starting reference points of said films in registry with one another; and thereafter photographing said motion picture film, said sound recording film and word exposure film upon said unexposed film to provide a composite film, whereby, upon projection of said composite film, semi-illuminated words are projected in synchronism with the vocal expression of the visual motion film.

References Cited by the Examiner

UNITED STATES PATENTS

| | | | |
|---|---|---|---|
| 1,483,581 | 2/24 | Hegerman | 352—240 |
| 1,489,794 | 4/24 | Stalling | 352—5 |
| 1,516,277 | 11/24 | Hegerman | 352—41 |
| 1,849,909 | 3/32 | Conkie | 352—240 |
| 1,913,048 | 6/33 | Disney | 352—5 |
| 1,940,424 | 12/33 | Lane | 352—37 |
| 1,974,710 | 9/34 | Freund | 179—100.3 |
| 1,985,253 | 12/34 | Hopkins | 352—25 |
| 2,357,593 | 9/44 | Leavell. | |
| 2,557,182 | 6/51 | Forgett | 88—24 |
| 2,847,903 | 8/58 | Modney | 88—24 |

FOREIGN PATENTS 341,566   10/21   Germany.

NORTON ANSHER, *Primary Examiner.*

WILLIAM MISIEK, EVON C. BLUNK, *Examiners.*